United States Patent [19]

Helmus

[11] Patent Number: 4,917,713
[45] Date of Patent: Apr. 17, 1990

[54] LOW-PROFILE AIR FILTRATION MODULE

[75] Inventor: Martin C. Helmus, Wyoming, Mich.

[73] Assignee: Comp-Aire Systems, Inc., Grand Rapids, Mich.

[21] Appl. No.: 355,633

[22] Filed: May 23, 1989

[51] Int. Cl.⁴ .............................................. B01D 46/02
[52] U.S. Cl. .................................... 55/385.2; 55/472; 55/473; 55/487
[58] Field of Search ................................. 55/471–473, 55/486, 487, 385.2, 560

[56] References Cited

U.S. PATENT DOCUMENTS

| 4,268,285 | 5/1981 | Mason | 55/473 X |
| 4,333,745 | 6/1982 | Zeanwick | 55/472 X |
| 4,333,750 | 6/1982 | Helmaus et al. | 55/423 X |

Primary Examiner—Charles Hart
Attorney, Agent, or Firm—Waters, Morse & Harrington

[57] ABSTRACT

This air filtration module has a rectangular housing separated vertically by a horizontal partition into upper and lower chambers communicating through a central opening in the partition panel. The lower chamber provides for distribution of air flow over the tops of filter units supported by the module below the distribution chamber. A blower is mounted at one end of the upper chamber, which discharges high-velocity air past the central opening in the partition panel, and into an opposite end of the upper chamber, where the velocity energy is converted to some degree to a lower velocity pressure energy. A ring surrounding the central opening above the partition panel stiffens the panel, and also provides support for an adjustable damper. The air intake through the module is drawn in by the blower through a preliminary filter in a frame horizontally opposite a bridge structure across the top of the module that supports the control devices associated with the blower.

10 Claims, 2 Drawing Sheets

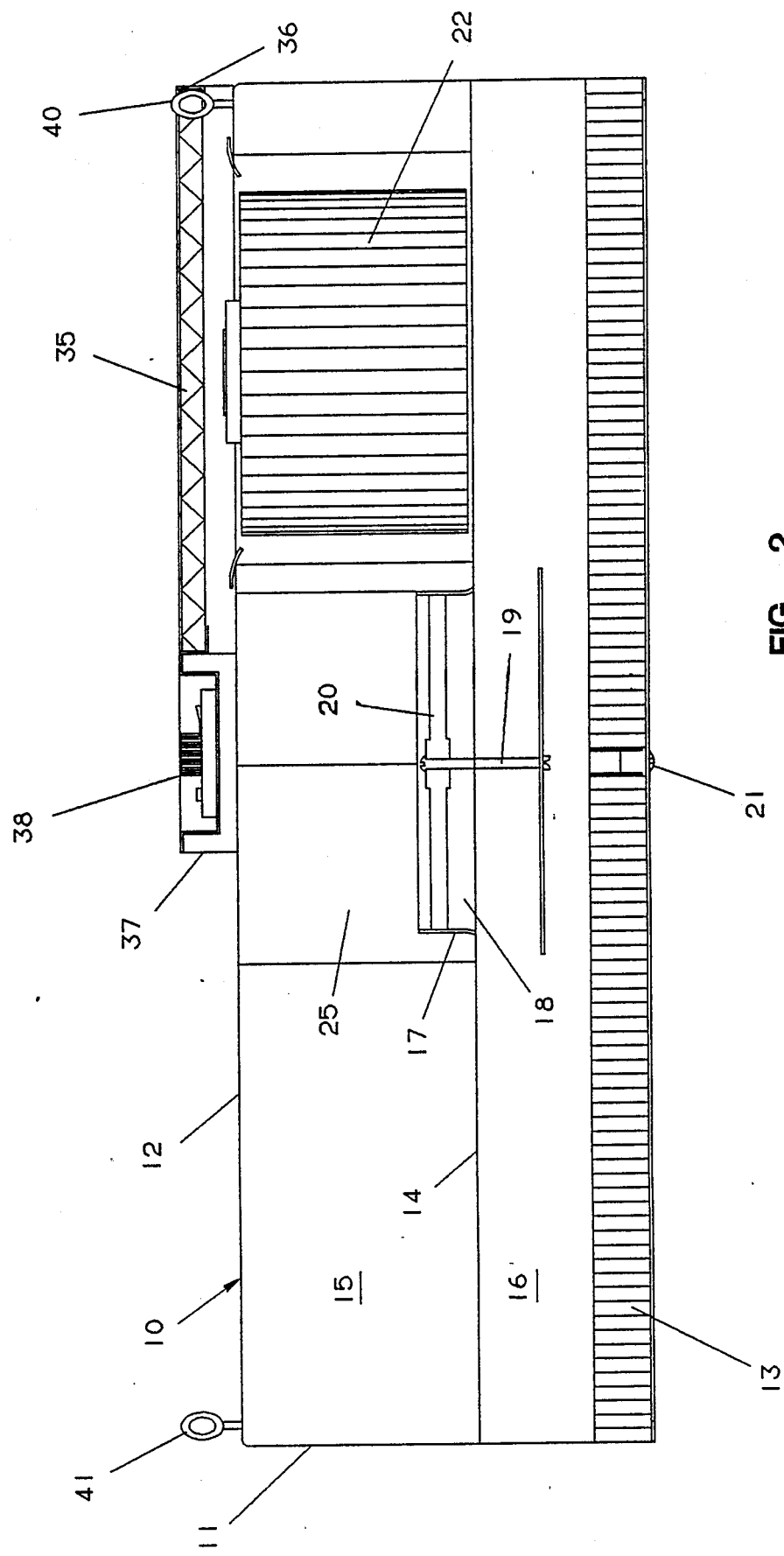

LOW-PROFILE AIR FILTRATION MODULE

BACKGROUND OF THE INVENTION

Many laboratory and factory operations require removal of substantially all suspended particles from the air in a work area, in order to prevent various kinds of contamination. Standard filter units have been developed for this purpose, as well as plenum structures supporting them and providing the necessary pressure differential to induce the flow of air through the filters and into the room. These plenum structures are often modular; and can occupy the entire ceiling area, or be installed in an opening in the ceiling. In many instances, space above the modules is at a premium, and special module design must be used to minimize the vertical height, as well as the need for clearance space above it. The principal problem here is in providing a uniform distribution of low-velocity air at the increased pressure over the filter units. Height restriction eliminates many of the more obvious arrangements for converting the high-velocity blower exhaust to the low-velocity, high-pressure, flow over the filters. Such conversion must be done without such sophisticated arrangements that would cause the cost of the modules to get out of hand. This requires that simple sheet-metal formation techniques be preserved, and standard off-day-shelf blowers be utilized. The present invention has accomplished this, as a result of extensive experimentation directed at getting the most filter pressure out of a given motorized blower within the design limitations imposed by height restrictions.

SUMMARY OF THE INVENTION

A preferably rectangular module housing is divided centrally by a horizontal partition panel into conversion and distribution chambers. The panel has a central opening through which air flows down from the conversion chamber into the distribution chamber above the filters. A preferably centrifugal blower is mounted at one end of the conversion chamber on a vertical axis, with the blower discharge directed along the module wall toward the opposite end of the conversion chamber. A duct plate reduces the blower opening, and conducts the flow past the central opening in the partition panel to avoid an aspiration effect that would otherwise result from a high-velocity draft flowing across the central opening.

DESCRIPTION OF THE DRAWINGS

FIG. 2 is a section on a plane 2—2 of FIG. 1.
FIG. 3 is a section on a plane 3—3 of FIG. 1.
FIG. 4 is a top view, on an enlarged scale, of the duct plate.

DESCRIPTION OF THE PREFERRED EMBODIMENTS

Figure 1:
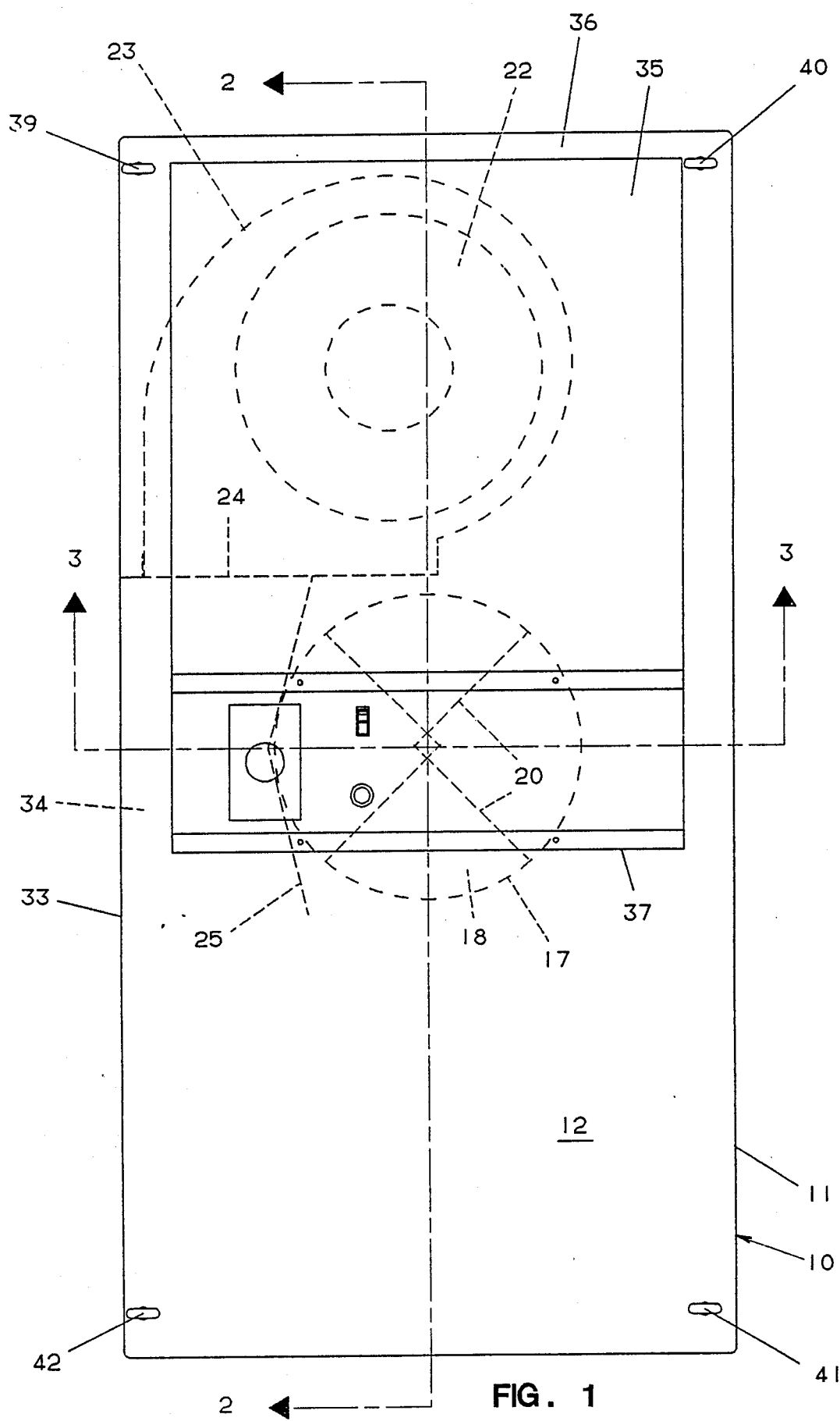
FIG. 1 is a top view of an air filtration module incorporating the present invention.

Referring to the drawings, the module generally indicated at 10 includes a housing 11 enclosed on all four sides, and providing a top enclosure panel 12. One or more replaceable filter elements 13 defines the otherwise open bottom of the module. A central horizontal partition panel 14 separates the interior of the module into a conversion chamber 15 above the partition panel, and a distribution chamber 16 below it and between the panel and the filter units. A ring-shaped collar 17 surrounds a central opening 18 in the panel 14, providing communication between the two chambers. An adjustable damper structure 19 is supported by diametrical beams 20 carried by the collar 17. The damper is adjustable through an opening normally covered by the plug 21. The collar 17 not only provides support for the damper, but also stiffens the partition panel and tends to align the air flow vertically.

A standard motorized centrifugal blower 22 is mounted in the right end of the conversion chamber 15, as viewed in FIG. 2. The outer periphery 23 of the blower has a spiral configuration terminating in the exhaust opening 24. Operation of the blower thus induces a relatively high-velocity flow of air from right to left, as viewed in FIG. 2. This relatively high-velocity flow is conducted past the collar 17 and the central opening 18 by the duct plate 25. The configuration of this plate is best shown in FIG. 4. Essentially, it is a piece of initially flat sheet steel bent to the illustrated configuration. Flanges as shown at 26 and 27 on the top and bottom of the plate are secured to the partition panel 14 and to the top panel 12 by conventional means such as rivets, screws, or spot-welding. The portion 28 of the duct plate forms a barrier across part of the exhaust opening 24' of the blower, thus keeping high-velocity flow away from the central opening 18. A flange 29 is preferably provided for attachment to the housing of the blower at the exhaust opening 24, as viewed in FIG. 1. The portions 30 and 31 of the duct plate form an angle at the apex 32, which is disposed approximately on a transverse vertical plane through the axis of the central opening 18. This configuration, in conjunction with the side wall 33 of the module, produces a venturi passage in which the blower velocity is slightly accelerated to the right of the apex 32, and then decelerated as it moves through the expansion provided to the left of the apex 32. The net effect of this is to get the high-velocity flow past the collar 17, without significant increase as a result of the constricted space between the collar and the side wall 33. The blower-induced flow is thus discharged generally into the left side of the conversion chamber, as viewed in FIG. 2, the function of which is to convert the high-velocity energy of the air into a lower velocity with increased pressure for delivery down through the central opening 18 to the distribution chamber over the filter units 13. The cross-sectional area of the venturi passage 34 is a fraction of the cross-sectional area of the opening 18, which thus makes possible a flow into the distribution chamber 16 not only at a lower speed, but also directed exclusively downward where the flow is more readily capable of lateral equalization in the distribution chamber 16 over the tops of the filter units. Such distribution would be difficult if a large-velocity lateral component of the flow still remained in the distribution chamber 16.

The air intake to the blower 22 enters from above through the preliminary filter 35 supported by a frame generally indicated at 36 defining an intake opening into the module. A sheet metal bridge structure 37 extends at least partially across the top of the module to provide support for the control devices generally indicated at 38 associated with the motorized blower 22. It should be noted that the bridge structure 37 and the frame 36 are horizontally opposite each other, and thus preserve a minimum overall height for the module. The illustrated module has been found to perform very effectively with exterior dimensions approximately four feet long, two feet wide, and an overall height of approximately sixteen inches. The housing portion defining the plenum below the level of the bridge structure 37 and the filter frame 36 is approximately fourteen inches. The unit will normally supported by turn buckles, or some equivalent suspension devices, engaging eye bolts at the corners of the module as indicated at 39-42. The blower 22 is referred to as a centrifugal blower with a diameter of twelve inches, and an axial length of six inches. This unit preferably rotates at approximately 1075 RPM, delivering one-third horse power. It is desirable to induce an air pressure over the filter units of approximately six-tenths of an inch of water, in order to obtain the desired flow characteristics. This pressure differential is determined by the nature of the filter units. The height of the conversion chamber 15 is preferably approximately twice that of the distribution chamber 16. The diameter of the opening 18 surrounded by the collar 17 is approximately twelve inches, and the collar has a height of two inches. The width of the venturi passage 34 at its throat, or narrowest point, is approximately five and three-quarters inches and the portion 30 of the duct plate should deviate from the adjacent wall 33 between ten and twenty degrees.

I claim:

1. An air filtration module including a housing having an intake opening in the top of thereof, means in said housing adapted to support at least one filter unit, and blower means mounted in said housing and disposed to draw incoming air downward through said intake opening, and discharge said air into said housing through an exhaust opening, wherein the improvement comprises:

a horizontal central panel secured in said housing, and separating the space defined by said housing into a conversion chamber above said panel and a distribution chamber below said panel and above the position of a filter unit established by said filter support means, said panel having a central opening providing communication between said chambers, said blower means being mounted in said conversion chamber beside said central opening; and a duct plate mounted in said conversion chamber, and disposed to conduct exhaust from said blower means past said central opening to a position of discharge into said conversion chamber.

2. A filtration module as defined in claim 1, wherein said housing is rectangular, and said blower means is disposed in one end thereof, said duct plate being adapted to confine said blower exhaust to a relatively short passage between said plate and a side wall of said housing.

3. A filtration module as defined in claim 2, wherein said duct plate has a barrier portion disposed across a portion of said blower means exhaust opening.

4. A filtration module as defined in claim 2, wherein said duct plate has a configuration establishing a venturi action in said passage.

5. A filtration module as defined in claim 4, wherein the downstream position of said configuration deviates from parallelism to said wall by between ten and twenty degrees.

6. A filtration module as defined in claim 1, additional including means adapted to support a preliminary filter in said intake opening.

7. A filtration module as defined in claim 1, additionally including a collar surrounding said central opening, and further including damper means mounted on said collar.

8. A filtration module as defined in claim 7, wherein said collar is above said central panel, and adjacent said duct plate and blower means.

9. A filtration module as defined in claim 1, wherein said blower means is a centrifugal blower having a spiral-shaped periphery, the outer extremity thereof being disposed adjacent a wall of said housing, said blower having a central intake disposed below said intake opening.

10. A filtration module as defined in claim 1, additionally including a bridge structure extending across said housing on top thereof, said bridge structure forming a support for control means associated with said blower, and further including means forming a preliminary filter frame horizontally apposite said bridge structure.

* * * * *